April 8, 1969 W. W. BUCHMAN 3,437,953

GIANT PULSE LASER CONTROL SYSTEM

Filed June 19, 1964

INVENTOR.
WILLIAM W. BUCHMAN
BY
Elliott & Pastoriza
ATTORNEYS

United States Patent Office 3,437,953
Patented Apr. 8, 1969

3,437,953
GIANT PULSE LASER CONTROL SYSTEM
William W. Buchman, Los Angeles, Calif., assignor to Korad Corporation, a corporation of New York
Filed June 19, 1964, Ser. No. 376,494
Int. Cl. H01s *3/11*
U.S. Cl. 331—94.5           6 Claims

ABSTRACT OF THE DISCLOSURE

A giant pulse laser system is provided particularly useful for very high gain laser materials. The system includes a first Q-spoiling means such as an electro-optical shutter enabling a rapid switching of the Q of the optical cavity of the laser at a desired point in time. In combination with this first Q-spoiling device is a second means for effectively spoiling the Q of the cavity. This second Q-spoiling means constitutes means for providing a magnetic field which varies in value along the axis of the laser crystal thereby lowering the internal gain of the crystal per unit length. The combination of these two Q-spoiling means enables considerably greater giant pulses to be provided by high gain laser materials than heretofore possible, the increased magnitude pulse being possible by the use of the magnetic field which decreases the gain of the crystal enabling a large inverted population level to be established and the generation of the pulse itself being accurately controlled by the fast switching characteristic of the external or electro-optical Q-switching device.

---

This invention relates generally to laser systems and more particularly to improved Q-spoiling means for use with high gain laser materials in giant pulse laser devices.

Conventional lasers comprise a host crystal doped with a primary additive providing the laser ions. Regenerative means in the form of reflective end coatings or mirrors are positioned at the ends of the crystal to define an optical cavity. Light energy is optically pumped into the crystal resulting in an inverted population of the laser ions between two energy levels. When a given threshold or inverted state is attained, a stimulated emission of radiation of light from the crystal will occur. This stimulated emission is effectively generated by light passing back and forth through the crystal and optical cavity defined by the regenerative means. The emitted light from the crystal is of a frequency corresponding to the energy difference between the two energy levels.

The stimulated emission generated when the inverted population tends to return to its original state may be coupled out of the system by making one of the mirrors partially reflective or alternatively, providing a small opening in one end mirror.

A giant pulse laser is similar to the conventional laser described above except that an electrooptical shutter such as a Kerr or Pockels cell is incorporated in the optical cavity. This shutter essentially spoils the Q of the optical cavity by blocking light during a portion of the pumping cycle to permit a much greater inverted population level to be achieved in the laser crystal before stimulated emission takes place. At a given time during the light pumping cycle, an external trigger changes the state of the electrooptical shutter to render it substantially transparent so that the Q of the optical cavity is restored. Since a considerably higher energy level may be built up in the laser from the light pump source before laser action can take place as a consequence of the "Q-spoiling," a giant pulse of radiation results when this energy is finally released upon triggering of the shutter.

When very high gain laser materials such, for example, as calcium fluoride doped with dysprosium, are used, a number of difficulties are encountered with giant pulse operation. The very high gain of the crystal material makes it difficult to obtain a large inversion above the threshold before the internal gain of the crystal becomes sufficiently large to cause spurious stimulated emission in an uncontrolled and undesirable way. The usual method of Q-spoiling, employing, for example, Kerr or Pockels cells, as described above, is insufficient because the gain in the laser rod or crystal becomes large enough to excite modes of oscillation which depend upon internal reflection. In the case of large rods, super radiance, amplified spontaneous emission, can deplete the inverted population level without even setting up a standing wave cavity mode. The situation is analogous to saturation of an electron beam travelling-wave amplifier by its amplified beam noise for large gains.

With the foregoing considerations in mind, it is a primary object of this invention to provide an improved giant pulse laser system in which, in addition to conventional type electrooptical shutters for Q-spoiling, there is provided further control means for effectively spoiling the Q or gain in the laser crystal itself to the end that depletion of the inverted population level as a consequence of internal oscillation modes is substantially diminished with the result that a desired high peak power giant pulse of radiation may be released.

More particularly, it is an object to provide in combination with conventional Q-spoiling means, additional Q-spoiling means effective to decrease the gain per unit length in the laser rod so that the combined Q-spoilers result in improved giant pulse laser operation and overcome the aforementioned difficulties when high gain laser material is employed.

Briefly, these and other objects and advantages of this invention are attained by providing in combination with a conventional electrooptical shutter disposed in the light cavity of a giant pulse laser system, a further Q-spoiling means in the form of a magnetic field. This magnetic field is caused to pass through the laser medium and varies in intensity in such a manner as to effectively broaden the fluorescent emission peaks at which normal lasering action takes place. As a consequence, the overall gain per unit length of the medium is diminished so that a desired inverted population level may be achieved in the laser medium prior to emission of the giant pulse of radiation.

A better understanding of the invention will be had by now referring to one embodiment thereof as illustrated in the accompanying drawings, in which.

Figure 1:
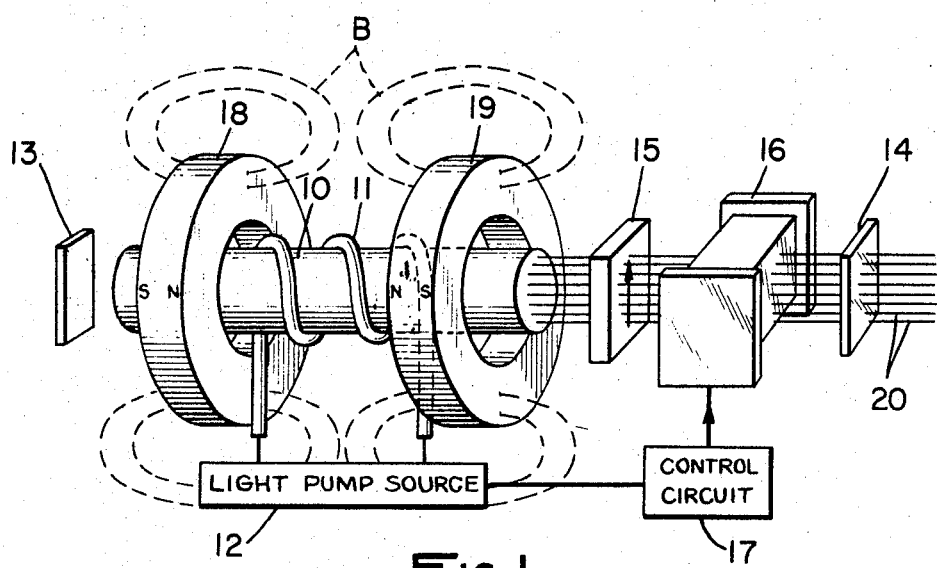
FIGURE 1 is a perspective view of a laser system incorporating the Q-spoiling means of this invention.

Referring first to FIGURE 1, there is shown a high gain laser medium such as a rod or crystal 10 which may comprise calcium fluoride doped with dysprosium to provide the lasering ions. A spiral flash lamp 11 surrounds the crystal 10 and is connected to a suitable light pump source 12. Regenerative means in the form of end mirrors 13 and 14, respectively, are provided to define an optical cavity for the laser 10. Disposed within this optical cavity is a suitable electro-optical shutter system which may comprise a polarizer 15 and Kerr cell 16. Opening of the shutter 16 is effected by a synchronization pulse from a control circuit 17.

In addition to the "Q-switching" provided by the Kerr cell, there is provided a second Q-spoiling means in the form of permanent magnets 18 and 19 which may be of the ceramic type. These magnets in the embodiment shown, surround the laser rod 10 and will provide a magnetic field B of varying intensity passing along the axis of the laser rod. The effect of the magnetic field B is to essentially lower the gain of the rod per unit length. This method of Q-spoiling could be used alone to provide a giant pulse laser. However, it is very difficult to switch a magnetic field rapidly in order to generate desired giant pulses. Therefore, by providing in the overall combination the Kerr cell 16 as the electro-optical switching means, improved giant pulses from high gain laser materials may be provided. When the Kerr cell 16 is triggered after a desired inverted population level has been achieved in the laser rod 10, a giant pulse will be emitted as indicated by the lines 20.

Figure 2:
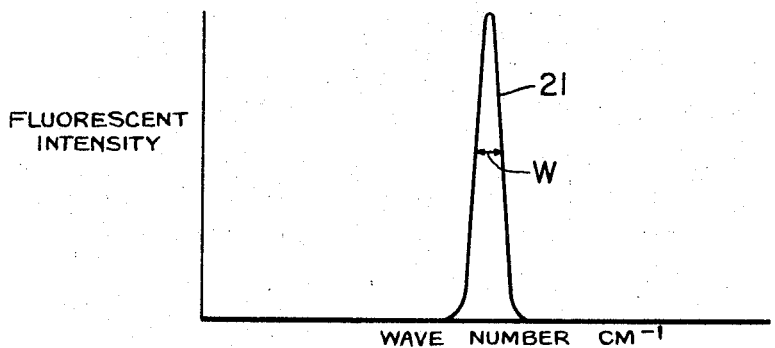
FIGURE 2 is a plot of fluorescent emission line of high gain laser material as used in FIGURE 1 in the absence of any Q-spoiling; and, FIGURE 3 illustrates the fluorescent emission line of FIGURE 2 when the Q-spoiling means of this invention is employed.

Referring now to FIGURE 2, the manner in which the additional Q-spoiling means in the form of the permanent magnets 18 and 19 functions to enable an inverted population level to be built up to a desired threshold will be understood. FIGURE 2 illustrates a fluorescent emission peak 21 which, for very high gain laser materials, is relatively high and narrow as indicated by the width W. By broadening this emission line, the gain per unit length is essentially lowered in the crystal rod.

Figure 3:
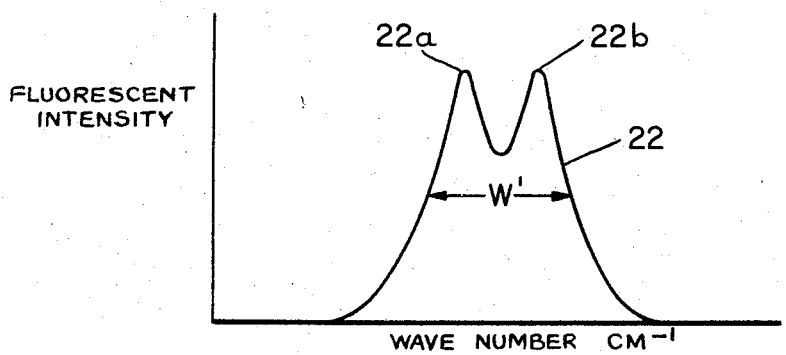

FIGURE 3 illustrates the effect of the magnet field B wherein it will be noted that the emission line 21 is effectively broadened as indicated at 22, usually resulting in a doublet or two peaks 22a and 22b. The broader width is indicated at W'. This splitting of the emission line is a consequence of the Zeeman effect. As large a magnetic field as possible is desired, preferably of the order of several thousand gauss. Further, it is desirable that the intensity of this field vary along the axis of the laser rod 10.

In the overall operation of the giant pulse laser of FIGURE 1, light energy from the light pump source and spiral flash lamp 11 is pumped into the laser rod 10. During this pumping cycle, an inverted population level of the lasering ions will take place defining first and second energy levels. The effectively broadened emission lines will substantially inhibit internal oscillation modes resulting from internal reflections and the like because of the spoiling of the gain of the rod until such time as a desired inverted population energy level has been achieved.

When the desired inverted population threshold is attained, the Kerr cell 16 is triggered by a suitable synchronizing pulse from the control circuit 17 to change from a substantially opaque condition to a substantially transparent condition, thereby releasing the giant pulse of radiation.

It will be evident accordingly that by combining the two methods of Q-spoiling, it is possible to obtain advantages which are not available individually. The static inhomogeneous magnetic field from the permanent magnets serves to lower the gain of the laser sufficiently to prevent internal spurious oscillation, thereby enabling much more energy to be stored in the rod before sufficient gain is obtained to reach the threshold of such oscillation. The optical cavity shutter, such as the Kerr cell, can then be switched rapidly to attain the desired giant pulse. Thus, the advantage of a magnetic field to broaden the emission line is realized without any limitation to the slow switching time of magnetic fields. This latter problem is solved by the optical cavity shutter for effecting the desired fast switching even though the shutter itself has no control over the gain per unit length inside the rod.

What is claimed is:

1. A high gain giant pulse laser system for producing a high peak power pulse of radiation, comprising, in combination: a very high gain laser medium within an optical cavity; a first Q-spoiling means in said optical cavity for rapidly switching the Q of said cavity; and a second Q-spoiling means for lowering the internal gain of said laser medium to a level at which a given high amount of energy may be stored in said laser medium without substantial internal oscillation losses and at a level such that actuation of said first Q-spoiling means releases said high peak power pulse of radiation.

2. A system according to claim 1, in which said second Q-spoiling means lowers the internal gain of said laser medium by effectively broadening the fluorescent emission peaks at which normal lasering action takes place.

3. A system according to claim 2, in which said second Q-spoiling means comprises magnetic field generating means positioned to pass a magnetic field through said laser medium.

4. A high gain giant pulse laser system for producing a high peak power pulse of radiation, comprising, in combination: a laser crystal; optical pumping means coupled to said crystal for effecting an inverted population state of laser ions in said crystal between given energy levels; regenerative means exhibiting high reflectance optically coupled to opposite end portions of said laser crystal to provide an optical cavity for stimulated emission; a first Q-spoiling means for inhibiting laser action in said optical cavity until a given high inverted population state has been effected in said laser crystal by said optical pumping means, and adapted upon actuation to restore the Q of said optical cavity; and a second Q-spoiling means for inhibiting internal oscillation modes in said crystal resulting from the normal high gain characteristics of said crystal, until said high inverted population state can be effected, whereby said high peak power pulse of radiation may be generated and released.

5. A system according to claim 4, in which said second Q-spoiling means comprises means for passing a magnetic field through said crystal to effect a broadening of the emission lines at which laser action takes place.

6. A system according to claim 5, in which said means includes a permanent magnet positioned such that said field varies in intensity along the axis of said laser crystal.

References Cited

UNITED STATES PATENTS 3,213,281  10/1965  Nedderman _____ 250—199
3,277,393  10/1966  Nicolai _____ 331—94.5

OTHER REFERENCES

Spectra-Physics circular, two pages, received in U.S. Patent Office on October 10, 1963.

JEWELL H. PEDERSEN, *Primary Examiner.*

E. BAUER, *Assistant Examiner.*